United States Patent
Hatekar et al.

(10) Patent No.: US 11,665,181 B2
(45) Date of Patent: May 30, 2023

(54) DETECTION OF HIGH-RISK BLOBS BASED ON AN ANALYSIS OF ASSOCIATED GRAPHICAL ELEMENTS

(71) Applicant: MICROSOFT TECHNOLOGY LICENSING, LLC, Redmond, WA (US)

(72) Inventors: Abhijeet Surendra Hatekar, Kirkland, WA (US); Guy Pergal, Herzelia (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 275 days.

(21) Appl. No.: 16/823,273

(22) Filed: Mar. 18, 2020

(65) Prior Publication Data

US 2021/0297428 A1 Sep. 23, 2021

(51) Int. Cl.
*H04L 9/40* (2022.01)

(52) U.S. Cl.
CPC ...... *H04L 63/1416* (2013.01); *H04L 63/1425* (2013.01); *H04L 63/1483* (2013.01); *H04L 63/20* (2013.01)

(58) Field of Classification Search
CPC ............ H04L 63/1416; H04L 63/1425; H04L 63/1483; H04L 63/20
See application file for complete search history.

(56) References Cited

U.S. PATENT DOCUMENTS

| | | | |
|---|---|---|---|
| 8,474,048 B2 * | 6/2013 | Masood | H04L 63/168 726/24 |
| 8,505,094 B1 * | 8/2013 | Xuewen | H04L 67/564 709/224 |
| 10,339,300 B2 * | 7/2019 | Shraim | G06F 21/53 |
| 10,686,826 B1 * | 6/2020 | Goutal | G06F 40/263 |
| 10,880,322 B1 * | 12/2020 | Jakobsson | H04L 51/08 |
| 2017/0078322 A1 * | 3/2017 | Seiver | G06F 21/577 |

(Continued)

FOREIGN PATENT DOCUMENTS

EP 3267349 A1 * 1/2018 ............ G06F 21/53

OTHER PUBLICATIONS

"International Search Report and Written Opinion Issued in PCT Application No. PCT/US21/015597", dated Apr. 9, 2021, 13 Pages.

*Primary Examiner* — Farid Homayounmehr
*Assistant Examiner* — Mudasiru K Olaegbe
(74) *Attorney, Agent, or Firm* — Newport IP, LLC; Scott Y. Shigeta

(57) ABSTRACT

Efficient and effectiveness malware and phishing detection methods select specific objects of a document based on an analysis of associated graphical elements of a document rendering. A received document may include a number of blobs, which can include URLs or code that generates URLs that can present potential risks. The system can score and/or rank each blob and its corresponding URLs based on a size, shape, position, and/or other characteristics of a visual element associated with each blob. The score or rank can be increased for visual elements that are most likely to be selected by a user, such as large visual elements positioned near the center of a document. The system can then test individual URLs selected based a corresponding rank or score. The test can efficiently reveal the presence of malware or phishing tactics by forgoing tests on URLs that are not likely to be selected.

18 Claims, 12 Drawing Sheets

(56) References Cited

U.S. PATENT DOCUMENTS

| | | | |
|---|---|---|---|
| 2017/0237764 A1* | 8/2017 | Rasumov | G06F 21/562 |
| | | | 726/25 |
| 2019/0238533 A1* | 8/2019 | Pointner | G06V 30/416 |
| 2020/0053111 A1* | 2/2020 | Jakobsson | H04L 63/1416 |
| 2020/0153842 A1* | 5/2020 | Anthony | H04L 63/145 |

* cited by examiner

FIGURE 4A

RANKED LIST 300

POLICY 118
- USE ALL FACTORS TO GENERATE AN ACCUMULATIVE SCORE
- EQUAL WEIGHT
- THRESHOLD SCORE = 20

| BLOB: VISUAL ELEMENT AND ASSOCIATED URL 102 | DISTANCE TO CENTER 402A | CONTENT ASSOCIATED WITH VISUAL ELEMENT 402B | SIZE OF TEXT OR IMAGE 402C | PROMINENCE OF GRAPHICAL CHARACTERISTICS 402D | GRAPHIC TYPE (TEXT/IMAGE) 402E | LEVEL OF SUSPICIOUSNESS 402F | ACCUMULATIVE SCORE 420 |
|---|---|---|---|---|---|---|---|
| DOWNLOAD | 9 | 8 | 8 | 7 | 8 | 2 | 42 |
| GET WORDPRESS | 9 | 8 | 5 | 6 | 6 | 2 | 36 |
| W | 8 | 8 | 8 | 4 | 2 | 2 | 32 |
| — THRESHOLD 310 — | | | | | | | |
| Showcase | 2 | 3 | 2 | 1 | 2 | 5 | 15 |
| ... | ... | ... | ... | ... | ... | ... | ... |
| Disclaimer | 1 | 1 | 2 | 1 | 5 | 4 | 15 |

FIGURE 4B

POLICY 118:
- USE POSITION AND SIZE FACTORS
- EQUAL WEIGHT
- THRESHOLD SCORE = 10

RANKED LIST 300

| ELEMENT/BLOB 102 | DISTANCE TO CENTER 402A | CONTENT ASSOCIATED WITH VISUAL ELEMENT 402B | SIZE OF TEXT OR IMAGE 402C | PROMINENCE OF GRAPHICAL CHARACTERISTICS 402D | GRAPHIC TYPE (TEXT/IMAGE) 402E | LEVEL OF SUSPICIOUSNESS 402F | ACCUMULATIVE SCORE 420 |
|---|---|---|---|---|---|---|---|
| DOWNLOAD | 9 | - | 8 | - | - | - | 17 |
| (W) | 8 | - | 8 | - | - | - | 16 |
| GET WORDPRESS | 9 | - | 5 | - | - | - | 14 |
| | | | | | | | THRESHOLD 310 |
| Showcase | 2 | - | 2 | - | - | - | 4 |
| ••• | ••• | ••• | ••• | ••• | ••• | ••• | ••• |
| Disclaimer | 1 | - | 2 | - | - | - | 3 |

FIGURE 4C

POLICY 118:
- USE POSITION AND SIZE FACTORS
- WEIGHT SCORES TO FAVOR POSITION BY 2X.
- THRESHOLD SCORE = 10

RANKED LIST 300

| ELEMENT/BLOB 102 | DISTANCE TO CENTER 402A | CONTENT ASSOCIATED WITH VISUAL ELEMENT 402B | SIZE OF TEXT OR IMAGE 402C | PROMINENCE OF GRAPHICAL CHARACTERISTICS 402D | GRAPHIC TYPE (TEXT/IMAGE) 402E | LEVEL OF SUSPICIOUSNESS 402F | ACCUMULATIVE SCORE 420 |
|---|---|---|---|---|---|---|---|
| DOWNLOAD | 18 | - | 8 | - | - | - | 26 |
| Ⓦ | 16 | - | 8 | - | - | - | 24 |
| GET WORDPRESS | 18 | - | 5 | - | - | - | 23 |
| | | | | | | | THRESHOLD 310 |
| Showcase | 4 | - | 2 | - | - | - | 6 |
| ... | ... | ... | ... | ... | ... | ... | ... |
| Disclaimer | 2 | - | 2 | - | - | - | 4 |

FIGURE 4D

POLICY 118:
- USE POSITION RISK FACTORS
- WEIGHT SCORES EQUALLY.
- THRESHOLD SCORE = TIME BASED

RANKED LIST 300

| ELEMENT/BLOB 102 | DISTANCE TO CENTER 402A | CONTENT ASSOCIATED WITH VISUAL ELEMENT 402B | SIZE OF TEXT OR IMAGE 402C | PROMINENCE OF GRAPHICAL CHARACTERISTICS 402D | GRAPHIC TYPE (TEXT/IMAGE) 402E | LEVEL OF SUSPICIOUSNESS 402F | ACCUMULATIVE SCORE 420 |
|---|---|---|---|---|---|---|---|
| DOWNLOAD | 9 | - | - | - | - | 2 | 11 |
| GET WORDPRESS | 9 | - | - | - | - | 2 | 11 |
| (W logo) | 8 | - | - | - | - | 2 | 10 |
| Showcase | 2 | - | - | - | - | 5 | 7 |
| ... | ... | ... | ... | ... | ... | ... | ... |
| Disclaimer | 1 | - | - | - | - | 4 | 5 |

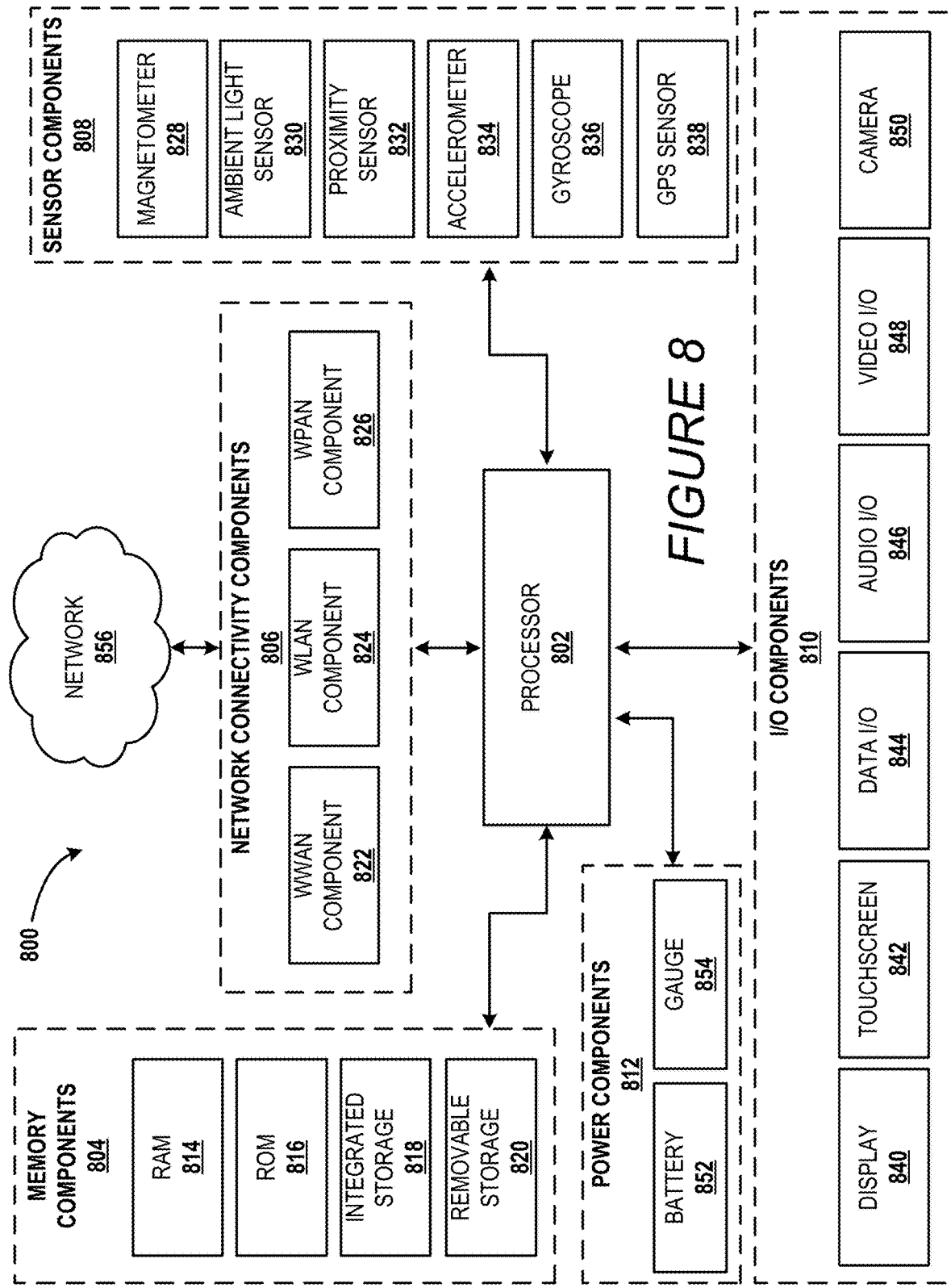

DETECTION OF HIGH-RISK BLOBS BASED ON AN ANALYSIS OF ASSOCIATED GRAPHICAL ELEMENTS

BACKGROUND

The development of effective security measures for countering malware and phishing tactics has continually presented a number of evolving challenges for system designers. Given the interconnected nature of computing systems and the large volume of data that is commonly processed in current systems, there is an increasing need for security measures to be both effective and computationally efficient. For instance, when a system receives a document, such as a word processing document, a Web page, an HTML-formatted email, or a PDF document, a system may be required to test all of the links embedded in the document, code embedded in the document, as well URLs that may be generated by the code embedded in the document. Given all of the various tests that need to be performed for each received document and each link within each document, a tremendous amount of computing resources is needed to maintain a suitable level of security.

Scenarios like the one described above also present complex design challenges when it comes to balancing a system's security level and a desired level of performance. For example, for email systems, users require emails to be delivered with minimal delay. However, this expectation can be difficult to meet as email traffic increases. In addition, it is more difficult to minimize the delay when a system is inundated with emails each having a large number of embedded links and embedded objects, e.g., Binary Large Objects (blobs). With this dilemma in mind, fraudulent practices implementing various forms of malware and phishing tactics attempt to inundate systems with large volumes of emails having a large number of embedded links and objects. This can compromise the security of a system in a number of ways. One being that large volumes of emails and/or links within emails create large workloads, which in essence, is a form of malware itself as it may cause a system to be prohibitively inefficient with respect to cost and the use of computing resources. Some systems can become fraught with delays in delivering emails, processing documents, and carrying out other common tasks in order to meet normal security standards.

It is with respect to these and other technical challenges that the disclosure made herein is presented.

SUMMARY

The techniques disclosed herein improve the efficiency and effectiveness of malware and phishing detection methods by selecting specific objects of a document based on an analysis of associated graphical elements. A document received by a system may include a number of objects that can include code or links that can cause interactions with remote computers that present potential risks. The objects may be in the form of Binary Large Objects ("blobs") associated with a visual element, one or more Uniform Resource Locators (URLs) and/or code embedded in a document. A system can apply an enrichment process to identify blobs associated with visual elements having selectable regions for enabling a user to take action on a URL or any code embedded within a document that may generate a URL. The system can score and/or rank each blob and associated URLs based on a size, shape, position, and/or other characteristics of an associated visual element. The score or rank can be increased for visual elements that are more likely to be selected by a user, such as large visual elements or visual elements positioned near the center of a document rendering. The system can then select individual URLs based a corresponding rank or score for testing, which can involve an analysis of target data retrieved from various sites identified in each of the selected URLs. The system can then generate a report identifying a risk level with respect to the presence of malware or data indicating the presence of one or more phishing tactics. The report can provide an indication of one or more security measures for URLs deemed to be high-risk.

By selecting specific URLs within a document for testing based on characteristics of an associated visual element, a system can focus computing resources on testing URLs and/or code that are most likely to be selected by a user. The techniques disclosed herein function as a filter that allows a system to concentrate resources on the analysis of URLs that are most likely to be selected by user and thus pose a higher level of risk. Thus, the system does not spend resources analyzing links that are not likely to be selected, which can lead to vast amounts of inefficiencies and stunts a system's ability to scale to large volumes of data. The disclosed techniques can also improve the security of a system by enabling a system to increase its accuracy in targeting specific URLs that have the highest probability of introducing malware and phishing tactics. More robust and complex tests can be run on the targeted links since the system is only testing a subset of the URLs in a document. The disclosed techniques can also save computing resources, such as processing cycles, memory resources, networking resources, by not testing targets that do not meet one or more thresholds.

The disclosed techniques also make a system immune from harmful tactics that involve inundating a system with a high volume of emails with each email having many URLs. As will be described in more detail below, by selecting URLs based on a score or a rank, a system can dynamically adjust the number of URLs that it tests based on the amount of available resources, while still focusing on the URLs posing the highest risk. The system can control a level of resources that is applied to a set of documents regardless of the number of links that are embedded in each received document.

The disclosed techniques can also improve the performance of a system by targeting only a subset of links detected in a document. This allows systems to deliver and process documents more quickly, thus allowing faster delivery of emails or faster processing of documents regardless of the number of links that are embedded in each received document.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4A shows one example of a ranked list of blobs based on a first set of factors and a policy defining a score threshold.

FIG. 4B shows another example of a ranked list of blobs based on a second set of factors and a policy defining a score threshold.

FIG. 4C shows another example of a ranked list of blobs having scores that are weighted based on one or more parameters.

FIG. 4D shows yet another example of a ranked list of blobs based on a another set of factors and a policy defining one or more operation-based thresholds.

FIG. 8 is a computer architecture diagram illustrating a computing device architecture for a computing device capable of implementing aspects of the techniques and technologies presented herein.

DETAILED DESCRIPTION

Figure 1:
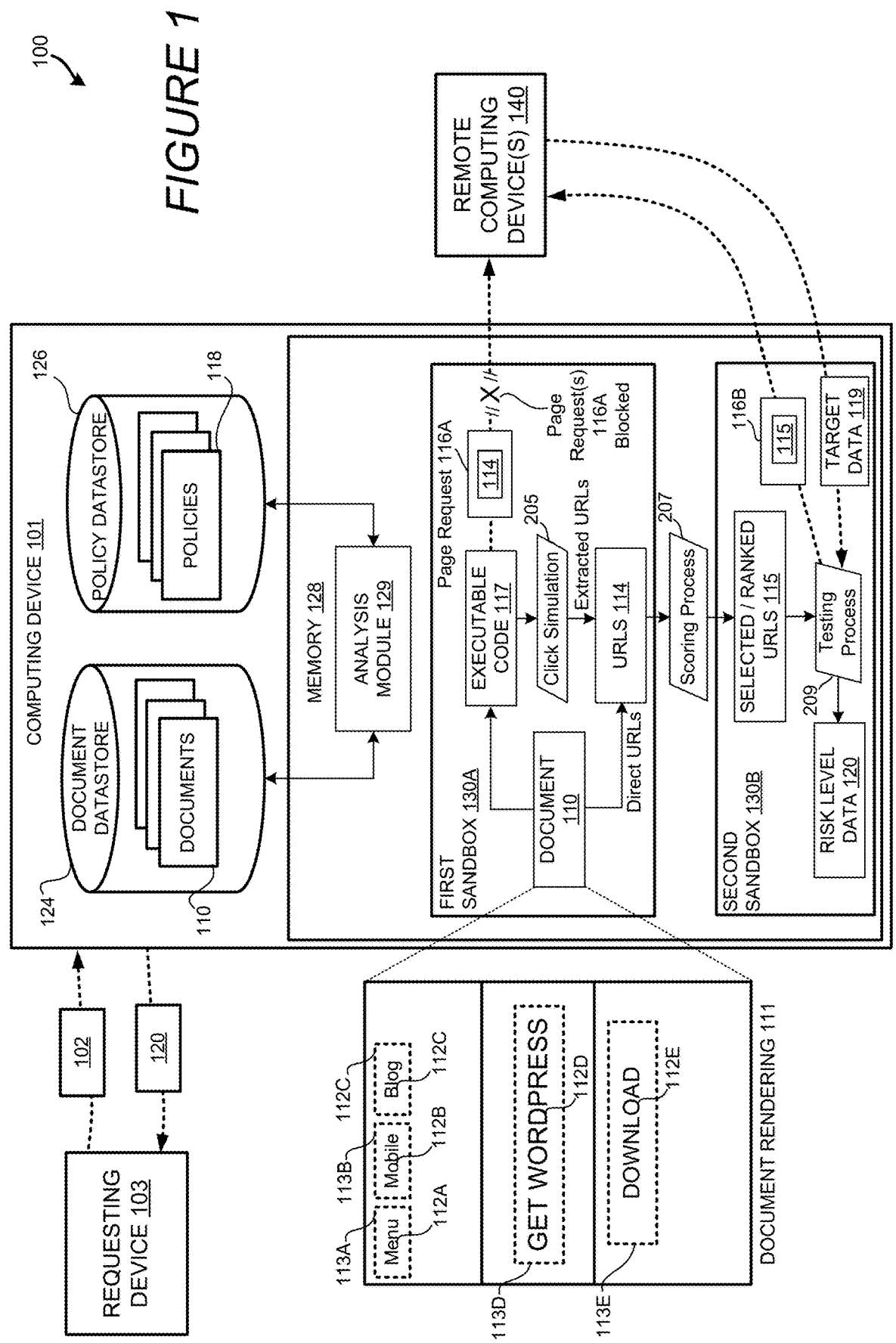
FIG. 1 is a block diagram of a system for providing improved efficiency and effectiveness of malware and phishing detection operations by selecting specific objects of a document based on an analysis of associated graphical elements determining a list of qualified contributors of a document.

FIG. 1 illustrates a system 100 for implementing aspects of the present disclosure. Generally described, the system 100 can provide a sandbox solution to identify malware and phishing activity that may be introduced via a document or a URL used for retrieving a document. When a document 100 is received, the system 100 generates a rendering 111 of the document 110. The system can apply an enrichment process to identify URLs 114 directly embedded in the document 110. The enrichment process can also utilize a click simulation process to generate URLs 114 from executable code 117 embedded in the document 110. The system 100 can then analyze visual elements 112 displayed in the rendering 111 to generate a score for associated blobs. The score of each blob can be based on a number of different factors, including a size and/or position of an associated visual element. The score can indicate a probability that a user is likely to select an associated visual element. The system 100 can then generate a ranked list of blobs based on the generated scores.

A testing process 209 can be applied to the URL based on their ranking, with some embodiments testing the highest ranked URLs first. The testing process 209 can control the number of tested URLs based on one or more thresholds defined in one or more policies 118. The testing process can then generate risk level data 120 based on an analysis of the selected URLs. The risk level data can indicate if a particular URL may introduce data that can be harmful to a computer or intended to deceive users into providing proprietary information. As described in more detail below, the techniques disclosed herein provide methods for identifying high-risk blobs while reducing the amount of computing resources needed to analyze each document. The techniques disclosed herein can also improve a system's performance, e.g., minimizing the delay of email deliveries, by only allowing a system to focus resources on blobs that are likely to be selected by a user.

In some configurations, the system 100 can include a computing device 101 configured to receive input requests 102 from a requesting device 103 and return risk level data 120 indicating one or more security risk levels of URLs associated with a document 110 included or identified in the input request 102. The computing device 101 can also be configured to receive, generate and modify one or more policies 118 defining criteria that can be utilized to determine risk levels of links with a document 110. The documents 110 and the policies 118 can be respectively stored in a document store 124, a policy datastore 126 or any other suitable medium. The computing device 101 can also comprise memory 128 for facilitating the execution of one or more software modules, such as the analysis module 129. The memory 128 can also be utilized to facilitate one or more sandbox environments, also referred to herein collectively as a "sandbox 130," for maintaining an isolated virtual computing environment capable of analyzing aspects of a document 110 and executing software modules. In some configurations, the computing device 101 can comprise a first sandbox 130A and a second sandbox 130B, each for managing different aspects of an analysis process.

For illustrative purposes, a sandbox 130 can be a security mechanism for separating running programs, in an effort to mitigate system failures or software vulnerabilities from spreading to other parts of the computing device 101. The sandbox 130 is used to execute untested or untrusted programs or code, possibly from unverified or untrusted third parties, suppliers, users or websites, without risking harm to the computing device 101, its operating system or any other connected machine. The sandbox 130 provides a tightly controlled set of resources for guest programs to run in, such as storage and memory scratch space. Network access, the ability to inspect the host system or read from input devices can be controlled. In the first sandbox 130A, network access is disallowed or heavily restricted. As will be described in more detail below, during a click simulation process, all page requests 116A from the first sandbox 130A requesting data 118 from one or more remote computing device(s) 140 are blocked, as shown. Then, during a testing phase executed in the second sandbox 130B, all subsequent page requests 116B from the second sandbox 130B requesting data 118 from the remote computing device(s) 140 are allowed, while containing all received data within the second sandbox 130B.

This example shown in FIG. 1 is provided for illustrative purposes and is not to be construed as limiting. The system can include more or fewer components than those shown. Other suitable variations can also apply to the system. For instance, although the example of FIG. 1 shows the document 110, the URLs 114 and the executable code 117 within a sandbox, the techniques disclosed herein can include any combination of these modules to be within the sandbox. For instance, in some configurations, the document, and the generated URLs 114 may remain out of the sandbox 130 and the executable code 117 can remain in the sandbox 130 while the executable code 117 is being analyzed by the click simulate process 205. As described in more detail below, the executable code 117 may be isolated during execution to ensure that all requests generated by the executable code 117 remain within a sandbox, such as the first sandbox 130A.

Figure 2:
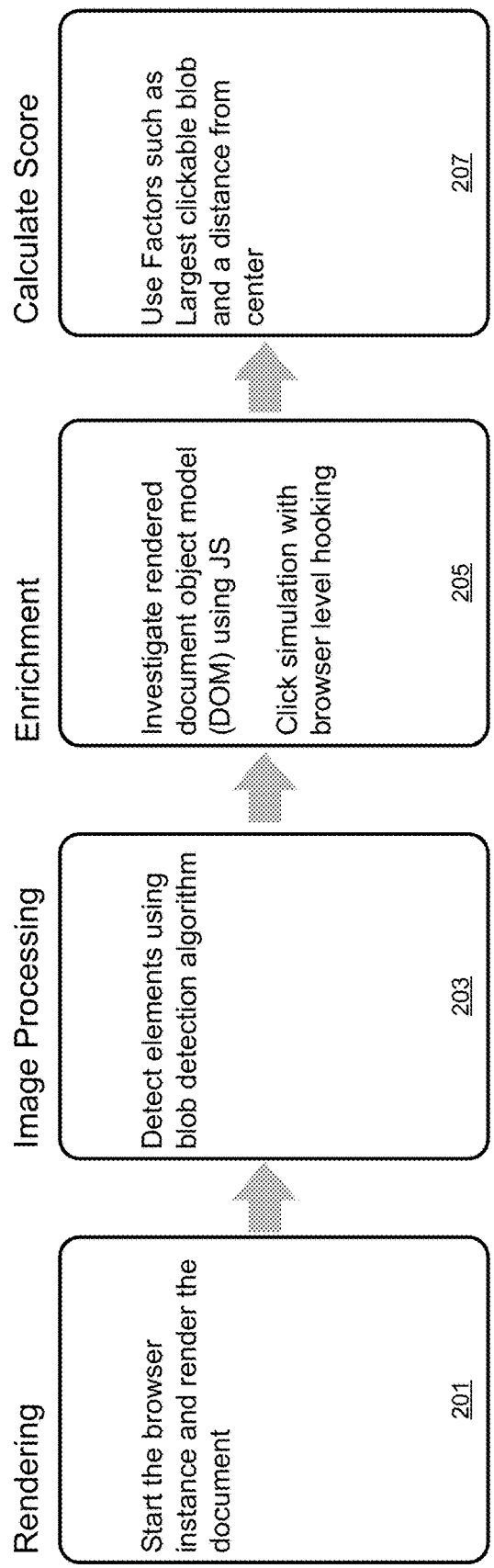
FIG. 2 is a block diagram of an example process for generating a ranked list of URLs based on scores determined from an analysis of associated graphical elements determining a list of qualified contributors of a document.

Referring to FIG. 2 in conjunction with FIG. 1, a process for generating a ranked list of links in response to an input request is shown and described below. The process can start with a request 102 received from a requesting device 103. The input of this process can be a URL or a file having code and/or links embedded with a document. In this example, in response to input request 102, the computing device 101 performs a two-stage process: a first stage that generates a list of URLs 115 which can include a ranked list of URLs and/or scores associated with each URL, and a second stage that tests a select set of URLs from the list of URLs 115.

The first stage can start at block 201 of FIG. 2 with one or more rendering operations. This part of the process can involve the execution of an application that can be used to render a document referenced or included in the input request. In the case where the input includes a URL, an application instance, such a browser instance, can be executed and used to render a document, e.g., a page, that is retrieved based on the URL. In the case where the input includes a document, other applications suitable for rendering a document or other data structures can be utilized to generate a rendering or an image of the document contents. In the example shown in FIG. 1, the computing device 101 can generate a document rendering 111 showing an arrangement of graphical elements 112, which are each associated with a corresponding selectable region 113.

Next, as shown in block 203, the system performs a number of image processing operations to identify objects of the document. For illustrative purposes, each object of the document may be referred to herein as a Binary Large Object ("blob"), where each blob may be associated with a selectable region 113, a visual element, a URL, and/or code that can be executed to generate a URL. A selectable region 113 can define coordinates that specify a predetermined area of a document rendering 111 that can receive an input to invoke some type of action. For instance, a selectable region 113 may be associated with a URL. When a user provides input at the selectable region, a computing device may retrieve data from a target host using the associated URL. The selectable region may also be associated with executable code 117 which may perform a number of actions. In one example, the selectable region may execute code that generates a URL, which may be used to retrieve data from a target host. In process block 203, the computing device 101 can detect visual elements 112 and/or associated selectable regions 113 of the document using one or more suitable detection blob detection algorithms.

As shown in block 205, the process can also involve an enrichment stage where the computing device determines if a blob is actionable. In one illustrative example, any suitable code, such as Java Script, can be utilized to develop a profile for each visual element by analyzing the rendered document object model (DOM). The computing device 101 can determine if a visual element, is associated with any executable code 117, e.g., a script, or if a visual element is associated with a link identifying a target host. 6:30 and 13:10 Any suitable technique can be utilized to identify a link, e.g., a URL or any other type of network address, associated with the selectable region 113. With reference to FIG. 1, all links directly associated with a selectable region 113 are identified and stored in a list of URLs 114. In some configurations, the computing device can analyze any attributes associated with each visual element and identify a link associated with each visual element and at least one associated selectable region. An attribute may include any kind of code or markup language that associates a visual element with a URL or an address identifying a target. The computing device can also identify and store any HREF properties associated with each selectable region 113.

In some configurations, the computing device can utilize click simulation to identify actionable blobs that are associated with scripts or any other type of executable code 117. In some configurations, when click simulation is performed, the computing device can execute any type of code 117 embedded in the document 110 that may generate a URL, which may be in the form of a page request. The URL is captured and placed in a list, such as a URL list 114 shown in FIG. 1. The computing device can block any outgoing page requests 116A that may be caused by executable code 117 embedded in the document 110. Thus, any click simulation processing can be performed in a sandbox, such as the first sandbox 130A. Once all outgoing requests are blocked, any script or code, e.g., the executable code 117, associated with the blob is executed and the behavior of the execution is captured. By blocking any outgoing requests, the system can protect itself from any malicious software that may be retrieved as a result of the request.

For illustrative purposes, a click simulation process may involve a number of operations where a computing device identifies selectable regions of a document and performs a number of actions that simulates a user selecting each of the selectable regions, thereby invoking an action associated with each selectable region. Thus, a URL associated with a selectable region can be processed into a page request or any executable code associated with a selectable region can be executed when the computing device performs an operation that simulates a user selection. When executable code 117 is run, the computing device monitors each operation that is performed by the executable code 117 and captures each operation, including the generation of any type of address, e.g., a URL.

When monitoring the behavior of the executable code 117 associated with an actionable blob, the system can determine if there are any outgoing requests to external computing devices. The click simulation is performed because a general analysis of a blob may not readily identify a URL to an outside source. Thus, a simulation may be necessary to determine if any code related to the embedded blobs actually create an outgoing request having a URL or any other type of address. As shown in FIG. 1, by the use of one or more click simulation operations, any URLs generated from the executable code 117 are stored in the list of URLs 114, which identifies one or more targets, e.g., sites. Thus, for illustrative purposes, visual elements or blobs are considered to be "actionable" they have an association with a selectable region and a URL identifying a target. Visual elements or blobs are also considered to be "actionable" they have an association with any other type of executable code 117 that performs one or more computer operations when an input is received at a corresponding selectable region of a document rendering.

Next, as shown in block 207, once the actionable visual elements are identified and a list of URLs 114 is generated, a score and/or a ranking is generated for each identified URL. A generated score or ranking can be based on a number of a number of factors. For example, a URL, and thus an associated blob, may be assigned a score based on, a size and position of an associated visual element, a shape of an associated visual element, content of an associated visual element, display characteristics of an associated visual element, and/or a level of suspiciousness an associated target. These examples are provided for illustrative purposes and are not to be construed as limiting. Any combination of these factors and other factors that quantify a characteristic of an associated address, executable code, or a visual element can be utilized to determine a score or a ranking for an identified URL.

In some configurations, a score may be based on physical characteristics of a visual element displayed within the document. For instance, a score may be based on a size and/or position of an associated visual element. In one illustrative example, a large visual element positioned at or near the center of a document rendering may have a higher score than a small visual element position near the top or the bottom of the document. In another example, a large visual element may have a higher score than a small visual element. In yet another example, regardless of a given size, a visual element positioned at or near the center of a document rendering may have a higher score than a visual element position near the top, bottom, or sides of the document. As described in more detail below, a number of physical characteristics of a visual element or content positioned near a visual element can be utilized to determine a score or ranking for a particular URL.

In some configurations, a score may be based on a level of suspiciousness of a URL. A level of suspiciousness can be based on a number of factors, which can include but are not limited to specific text in a URL, a suffix of a URL, behavior or characteristics of a target identified by a URL, etc. For example, if a URL is associated with a host having a remote domain, that URL can be assigned a score that indicates a higher level of suspiciousness versus links having a local domain. In another example, if a target URL has a predetermined suffix that is marked has having a negative history, that URL can be assigned a score that indicates a high level of suspiciousness. In such an example, URL attributes, such as a suffix, can be placed on a list and the list can be updated over time as behavior of sites from such address characteristics is tested. In yet another example, a URL can be assigned a score or ranking that indicates a high level of suspiciousness if it has particular keywords or names in the address. For instance, a URL having the text "Office 365" but not pointing to an official Office 365 address, can be assigned a score or ranking that indicates a high level of suspiciousness.

A combination of factors can be also considered based on a policy. For instance, a policy may indicate that banking domain names don't typically end with the suffix ".EU" and in such cases any type of baking tradename in a target URL having a predetermined suffix can be assigned a score or ranking that indicates a high level of suspiciousness. In yet another example, other factors, such as a level of security provided by a particular site can be used to determine a level suspiciousness with respect to a URL. For example, if a target site generates pages that requires users to provide sensitive information, and that page is not communicated using a secure connection, an associated URL can be assigned a score or ranking that indicates a high level of suspiciousness.

The scores or rankings determined for each URL can be utilized to select a subset of URLs for testing. As shown in FIG. 1, a scoring process 207 can receive a list of URLs 114 from the first sandbox 130A and provide a subset of URLs, referred to herein as "selected/Ranked URLs 115." By selecting a subset of the URLs, or in essence by filtering the URLs, a higher level of efficiency and a higher level of security can be achieved by allowing the computing device to focus computing resources on URLs that pose the highest level of risk. A selection process based on a score for each URL, which can be based at least in part on a physical characteristic of an associated visual element, can help a computing device to identify links that are most likely to be selected by a user, and thus ignoring links that are not likely to be selected. This can save in number of computing resources, including processing resources, memory resources, and networking resources, by avoiding the need to test each link is discovered within a document. In addition, the techniques disclosed herein may allow systems to meet performance metrics. In one particular example, an email system may be able to test incoming emails more efficiently and mitigate the delay in an email delivery process.

A shown in FIG. 1, a system may identify a set of URLs 115 and execute one or more tests to determine a threat or risk level, also referred to herein as a risk level, for each URL in the set of URLs 115. In some configurations, a testing process 209 can be executed in a sandbox, such as the second sandbox 130B. In the second sandbox, the computing device 101 can generate a number of requests 116B for each selected URL 115 to obtain target data 119 that is provided by one or more remote devices, e.g., targets identified in each of the selected URLs 115. The obtained target data 119 can be analyzed for malware and other types of other issues. In some configurations, any content interpreted in the obtained data that indicates any type of phishing activity, e.g., requests or prompts for sensitive information, can be flagged as having a high risk level. The system can generate risk level data 120 indicating risk level scores or any other data indicating security risk levels for one or more URLs.

In some configurations, the risk level data 120 can be returned to the requesting device 103. The risk level data 120 may cause one or more computing devices, such as the requesting device 103 or the computing device 101, to take actions for implementing one or more security measures. For instance, a computing device may block requests that include certain URLs having a threshold level of risk. Alternatively, a computing device may block recipients from receiving a particular email containing the original document identified in the input request 102. These examples are provided for illustrative purposes and are not to be construed as limiting. It can be appreciated that a number of different actions combination of actions can be implemented in response to the generated output 120.

Figure 3A:
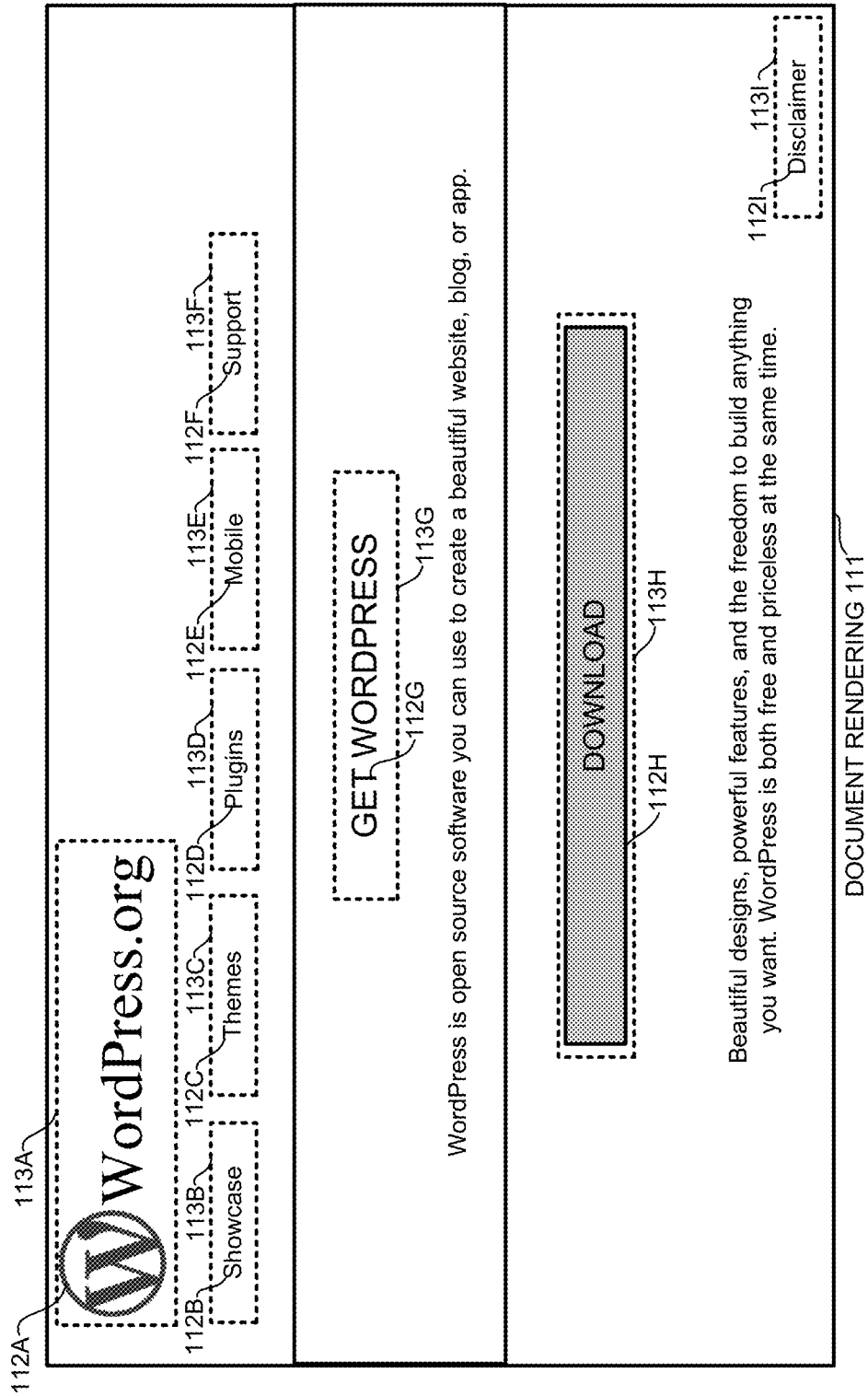
FIG. 3A is an example of a document rendering having visual elements and corresponding selectable regions for invoking one or more computer-implemented actions in response to a user selection of a visual element.
Figure 3B:
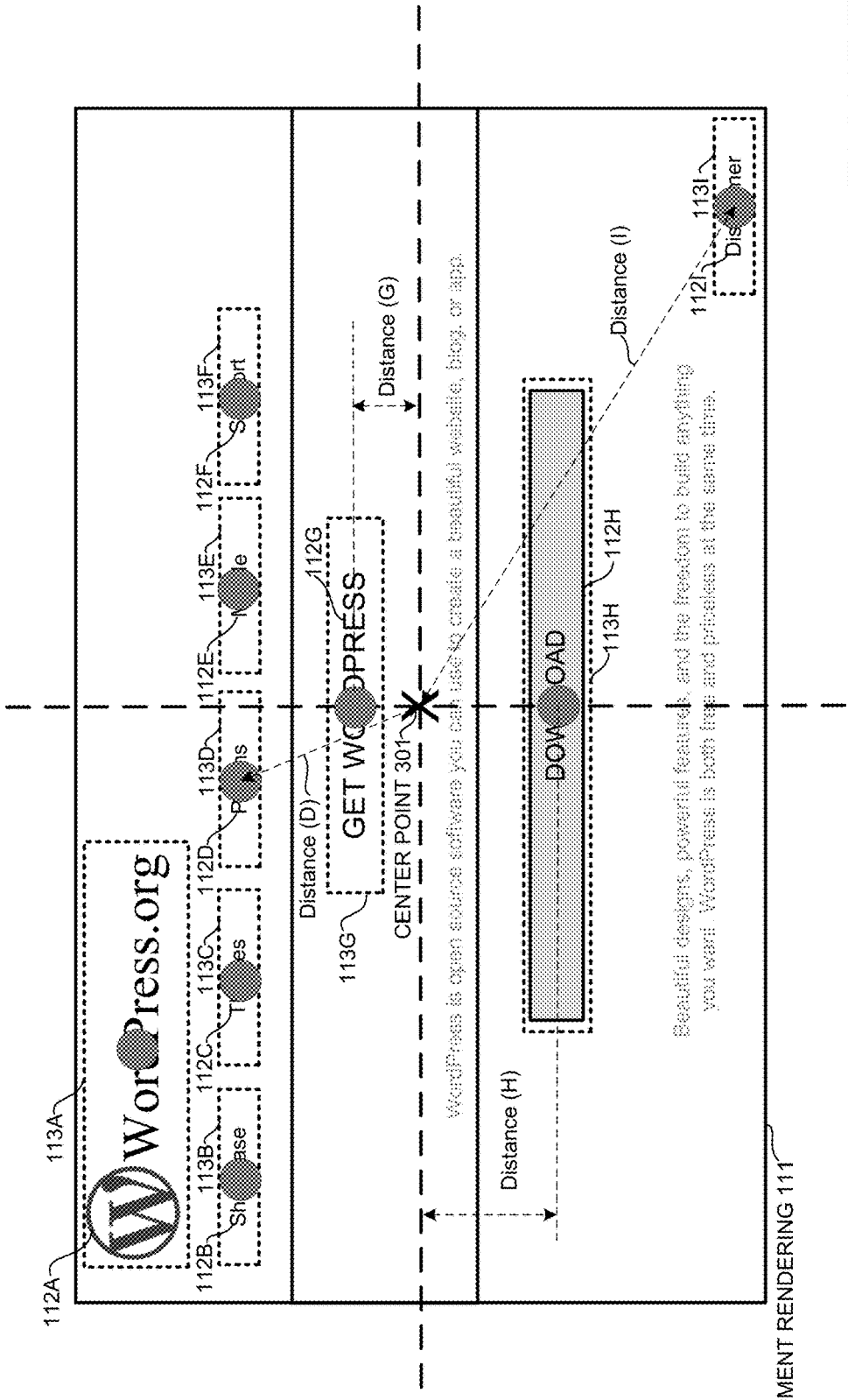
FIG. 3B shows how a center of mass for each visual element of a document rendering can be analyzed with respect to a predetermined point in the document rendering.

Referring now to FIG. 3A-4D, several examples of how the physical characteristics of a visual element and other factors may influence a score or ranking of a particular blob and its associated link. FIG. 3A illustrates a detailed view of a rendered document 111. In this example, the rendered document comprises a plurality of visual elements 112, each of which are associated with a number of selectable regions 113, i.e., visual elements 112A-112I are respectively associated with regions 113A-113I. As shown in FIG. 3B, a center of mass (denoted by shaded circles) can be determined for each visual element 112. Any suitable technology for determining a center of mass for a graphical element can be utilized.

The computing device can then determine the distance between each center of mass and any predetermined position of the document rendering, such as the center point 301. For example, a Distance (D) can be calculated between the center of mass for the fourth visual element 112D in relation to the center point 301 of the document rendering 111, Distance (G) can be calculated between the center of mass for the seventh visual element 112G in relation to the center point 301 of the document rendering 111, Distance (H) can be calculated between the center of mass for the base eighth visual element 112H in relation to the center point 301 of the document rendering 111, Distance (I) can be calculated between the center of mass for the ninth visual element 112I in relation to the center point 301 of the document rendering 111, etc. These distances can be utilized to determine a score or ranking for each visual element and each associated blob. In some embodiments, elements that have a shorter distance to the center point 301 have a higher score than elements that are further from the center point 301.

For illustrative purposes, example scores for characteristic of each visual element is shown in FIG. 4A. These examples are provided for illustrative purposes and are not to be construed as limiting. It can be appreciated that other scores or any order indicating a ranking using different scales can be utilized. It can also be appreciated that any predetermined point within a visual element, other than a center of gravity, may be used. It can also be appreciated other points can be utilized other than the center point of a user interface. For instance, a distance between any point in a visual element and an edge of the user interface or a document rendering can be utilized to calculate a score or ranking. Some configurations, it can be beneficial to provide visual elements that are positioned near the center of a document rendering with a higher score given that is more likely a user would select that visual element based on its position. Thus, visual elements that are closer to an edge of a document rendering may have a lower score than visual elements that are further from the edge.

As shown in the example table of FIG. 4A, a number of other factors 402 can be utilized to score each visual element and each corresponding link. In this example, in addition to a distance to center 402A, content associated with a visual element 402B can be analyzed and used to influence a score of a blob. For instance, some predetermined keywords can cause a score to increase versus other keywords, e.g., the word "download" may be associated with a higher score versus the word "disclaimer." Other factors such as the size of text or a size of an image 402C can be analyzed. Links associated with text having a larger font sizes or larger images can cause a score to increase versus text having a smaller font size or a smaller image. In another example, a prominence of a graphical characteristic 402D can be analyzed and used to influence a score of a blob. This may include any type of characteristic, such as a shape of an icon, a level of contrast to a surrounding background, a color, a number of colors, or any other physical characteristic that can influence the user's likelihood of selecting or noticing a particular link. For illustrative purposes, the terms score and rank can be used interchangeably. An order in which a URL is ranked can indicate a priority or score, and in turn, any score can be used to determine a rank.

In general, any visual element having a higher prominence level or more prominent graphical features can be associated with a higher score. In one illustrative example, red visual elements, or other colors having a high level of prominence, may have a higher score versus blue visual elements. In another example, visual elements having a higher contrast to a background color can also have a higher score than visual elements that have a relatively lower contrast to a background color. Graphical features can include but are not limited to colors, border thickness, line thickness, a number of colors, a number of colors having a threshold level of contrast, etc. Thus, a first visual element having thicker lines, more colors or more pronounced shapes than a second visual element may generate a score for the first visual element that is higher than the score for the second visual element.

In another example, a graphic type 402E can be analyzed and used to influence a score of a blob. For instance, a visual element including a bitmap image may have a higher score than a visual element that only includes ASCII text. In addition, any type of analysis of an associated URL can influence a score of a blob. For instance, one or more characteristics of a URL can be used to determine a level of suspiciousness 402E. The level of suspiciousness can be utilized to generate a score, where a higher level of suspiciousness can increase the score which can be combined with other scores to determine an accumulative score 420.

These examples are provided for illustrative purposes and are not be construed as limiting. It can be appreciated that any combination of factors, including factors that are not listed herein, can utilized to select one or more graphical element. In addition, individual scores for each factor can be combined using a number different techniques. For instance, although the sample data set of FIG. 4A illustrates an example were the individual scores of each factor are added to determine an accumulative score 420, it can be appreciated that other types of approaches can be utilized to derive an accumulative score 420, including, averaging each score, etc.

It can also be appreciated that a policy 118 can be utilized to score, rank and select specific URLs from the list 114. In the example of FIG. 4A, the policy defines which factors to consider, how each individual score may be weighted, and a threshold 310 that may be used to select certain URLs. In some embodiments, the computing device may generate a ranked list of the URLs and the testing process, as shown in FIG. 1, can test each URL starting with the highest ranked URL. The system can then test as many URLs as possible within a time limit or any other metric-based limit, etc.

As summarized above, the ranked list 300 can be generated based on the use of any combination of factors. For example, as shown in FIG. 4B, the ranked list 300 can be based on a position of each associated visual element with respect to a particular point in a document rendering, e.g., a center point, and a size of the visual element.

In other configurations, the system may weight different scores based on contextual information related to a state of a computer or a testing preference. For instance, a position of a visual element may be given more weight when calculating an accumulative score. A weight may be given to a particular score, for instance, based on data indicating a type of computer that is associated with end users, historical patterns of end users, etc. A weight may be given to a particular score, for instance, based on a screen size of a device or the capabilities of a screen. For instance, a score based on a color of a visual element may be given less weight if a computer has a grayscale screen or a screen is set to a grayscale mode. FIG. 4C illustrates an example of a ranked list that is influenced by a policy defining different weights for different factors. In this example, the score associated with each position is given more weight versus other factors.

FIG. 4D illustrates another example of a ranked list that is influenced by a position of each visual element and a level of suspiciousness of each associated link. In this example, the policy 118 indicates that a threshold for analyzing each link can be time-based. For instance, a server can test as many links as possible with the list, starting with the highest ranked URL, within a predetermined period of time. The server can then test as many URLs as possible during that time period. Such thresholds can also be based on other factors such as a system's current workload level or available processing resources. For example, a time period, a number of selected URLs, or a threshold may increase when the workload is lower and the time period, number of selected URLs, or the threshold may decrease when a system workload is higher. These examples are provided for illustrative purposes and are not be construed as limiting. Any combination of factors can be utilized to determine a ranking or a score for a blob, and any performance metric or historical data indicating past threat levels can be used to adjust one or more thresholds.

Figure 5:
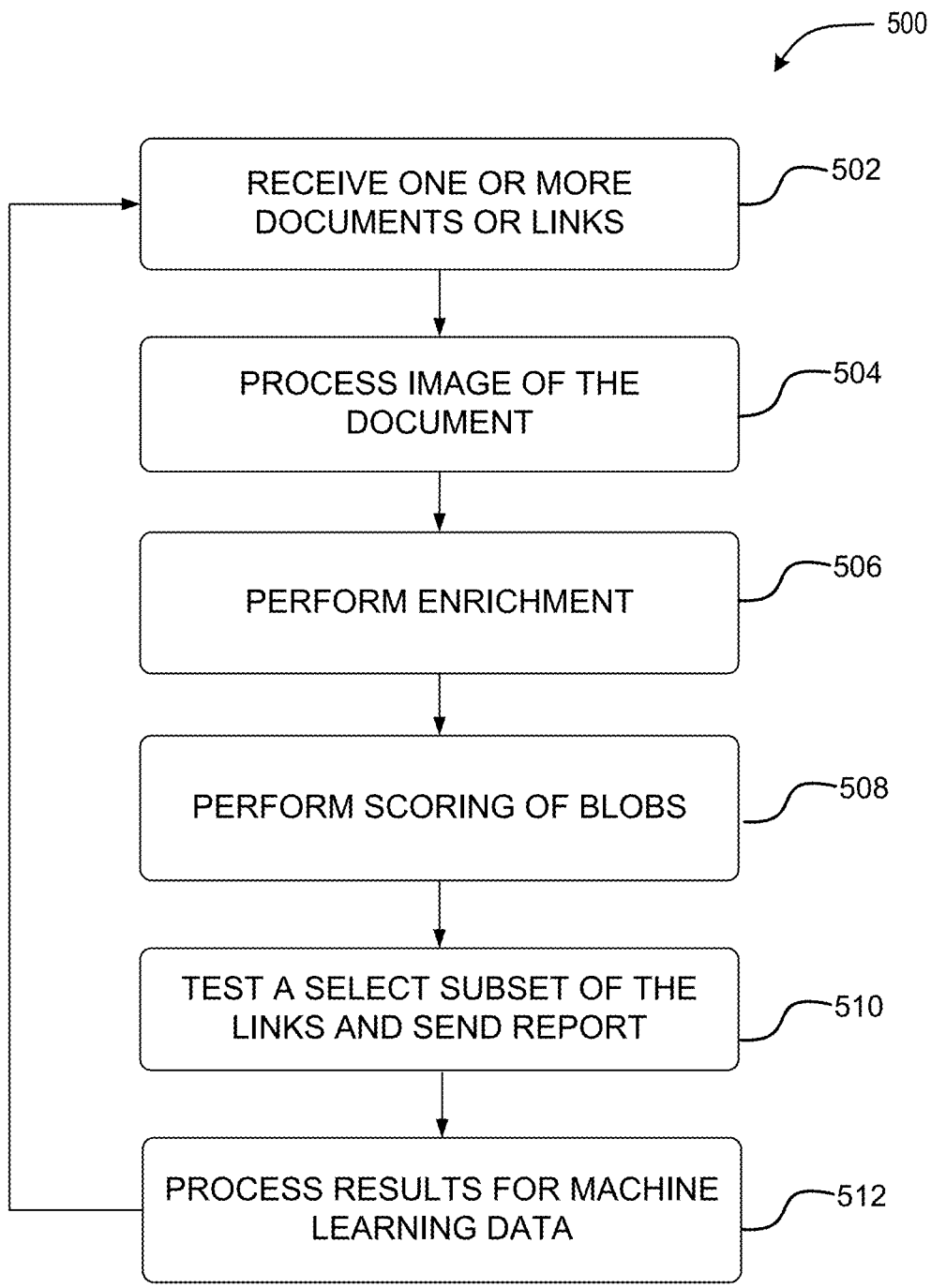
FIG. 5 is a flow diagram showing aspects of a routine for enabling the techniques disclosed herein.

Turning now to FIG. 5, aspects of a routine 500 for providing efficient detection of high-risk blobs based on an analysis of graphical elements of a document are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 502 where the analysis module 129 and/or other modules receives, obtains, or otherwise accesses a document. Operation 502 can involve receiving a request 102 to determine a risk level an electronic document 110. The document can have a number of blogs each having one or more visual elements 112, and associated URL and/or embedded code that can generate a URL. The techniques disclosed herein can apply to any type of document, including but not limited to a Webpage retrieved from a URL, a calendar invitation, a PDF file, or any other data that defines a layout of content.

Next, at operation 504, the analysis module 129 and/or other modules can process an image of a document. In operation 504, one or more applications can be utilized to render a document on a user interface. In some configurations, operation 504 can identify elements of the document, such as a position of visual elements, the size of visual elements, etc. Coordinates can be generated for each visual element and other aspects of the document can be identified, such as coordinates for associated selectable regions, etc.

Next, at operation 506, the analysis module 129 and/or other modules can perform an enrichment process to identify URLs associated with the visual elements. In one aspect, any suitable code, such as Java Script, can be utilized to develop a profile for each visual element by analyzing the rendered document object model (DOM). The computing device 101 can determine if a visual element, is associated with any executable code 117, e.g., a script, or if a visual element is associated with a link identifying a target host. Any suitable technique can be utilized to identify a link, e.g., a URL or any other type of network address, associated with the selectable region 113. In some embodiments, the analysis module 129 can analyze the visual elements 112 to identify URLs 114 embedded in the document, wherein each of the URLs 114 embedded in the document are associated with at least one visual element 112 and at least one associated selectable region 113 of the document 110.

In another aspect of operation 506, the analysis module 129 and/or other modules can perform a click simulation process 205 for executable code 117 embedded in the document 110, wherein the click simulation process 205 causes the executable code 117 associated with one or more selectable regions 113 of the document 110 to generate additional URLs 114, wherein each of the additional URLs 114 are associated with one or more visual elements 112 and one or more selectable regions 113. The page requests 116A generated by the click simulation process 205 are blocked from transmission to one or more remote computing devices 140.

At operation 508, the analysis module 129 and/or other modules can generate a score for one or more URLs 114 and a corresponding blob identified in the analysis of the visual elements 112 and the additional URLs 114 generated by the executable code 117. The score for each URL 114 is based on a size or a position of at least one associated visual element. In some configurations, a first score for a first URL of the one or more URLs can be greater than a second score for a second URL of the one or more URLs when a first visual element associated with the first URL has a shorter distance to a center point 301 of a rendering of the document than a second visual element associated with the second URL. In some configurations, a first score for a first URL of the one or more URLs is greater than a second score for a second URL of the one or more URLs when a first visual element associated with the first URL is physically larger than a second visual element associated with the second URL. In some configurations, a first score for a first URL of the one or more URLs is greater than a second score for a second URL of the one or more URLs when a first visual element associated with the first URL is has a color or a graphical feature that is more prominent than a second visual element associated with the second URL.

These examples are provided for illustrative purposes and are not to be construed as limiting. The present disclosure can involve any combination of these factors and other factors, including a level of suspiciousness that may be determined for each URL. Thus, in some configurations, each score of the one or more URLs can be further based on an associated level of suspiciousness of each URL, wherein a first score for a first URL of the one or more URLs is greater than a second score for a second URL of the one or more URLs when a level of suspiciousness associated with the first URL is greater than a level of suspiciousness associated with the second URL.

At operation 510, the analysis module 129 and/or other modules select a subset of URLs 115 from the URLs 114 identified in the analysis of the visual elements 112 and the additional URLs 114 generated by the executable code 117. The individual URLs 114 that have an associated score that meets one or more criteria are selected for the subset of URLs 115. The analysis module 129 and/or other modules can then cause an execution of a testing process 209 for the subset of URLs 115, wherein the testing process 209 comprises generating subsequent page requests 116B for target data 119 from the one or more remote computing devices 140 identified in the subset of URLs 115. The testing process 209 can generate risk level data 120 from an analysis of one or more computer-implemented actions caused by the target data 119. The risk level data 120 can indicate a risk level for the individual URLs of the subset of URLs 115. In some configurations, the computing device can communicate the risk level data 120 to a requesting device 103 providing an indication of one or more security measures to be performed in association with the individual URLs of the subset of URLs 115. The risk level data 120 can also be used locally to identify one or more security measures to be performed.

In some configurations, the computing device can generate a ranked list 300 of the individual URLs, wherein the ranked list is based on individual scores associated with the individual URLs. The subset of URLs can then be is based on a number of URLs that are tested within a predetermined time period, wherein the testing process processes the individual URLs in an order according to the individual scores, starting with URLs that are ranked highest in the ranked list. Thus, if the system can only spend a certain period of time to test certain documents, such as emails, that system can start with the highest rate email and work its way down the list within a given time period. The time period may fluctuate based on available resources of the system.

As shown in operation 512, machine learning processes can be applied to adjust the time period based on the results of the testing process. For instance, if a number of test results indicate that risk levels have increased for certain documents, a computing system may increase the given time period to allocate more resources for the testing process. In addition to a time period, the system may determine a threshold number of items to test on the list, where testing would start with the highest rate items on the list. Threshold can change based on the factors described above that can be used to adjust the time period. From operation 512, the system can return to operation 502 for further processing.

Figure 6:
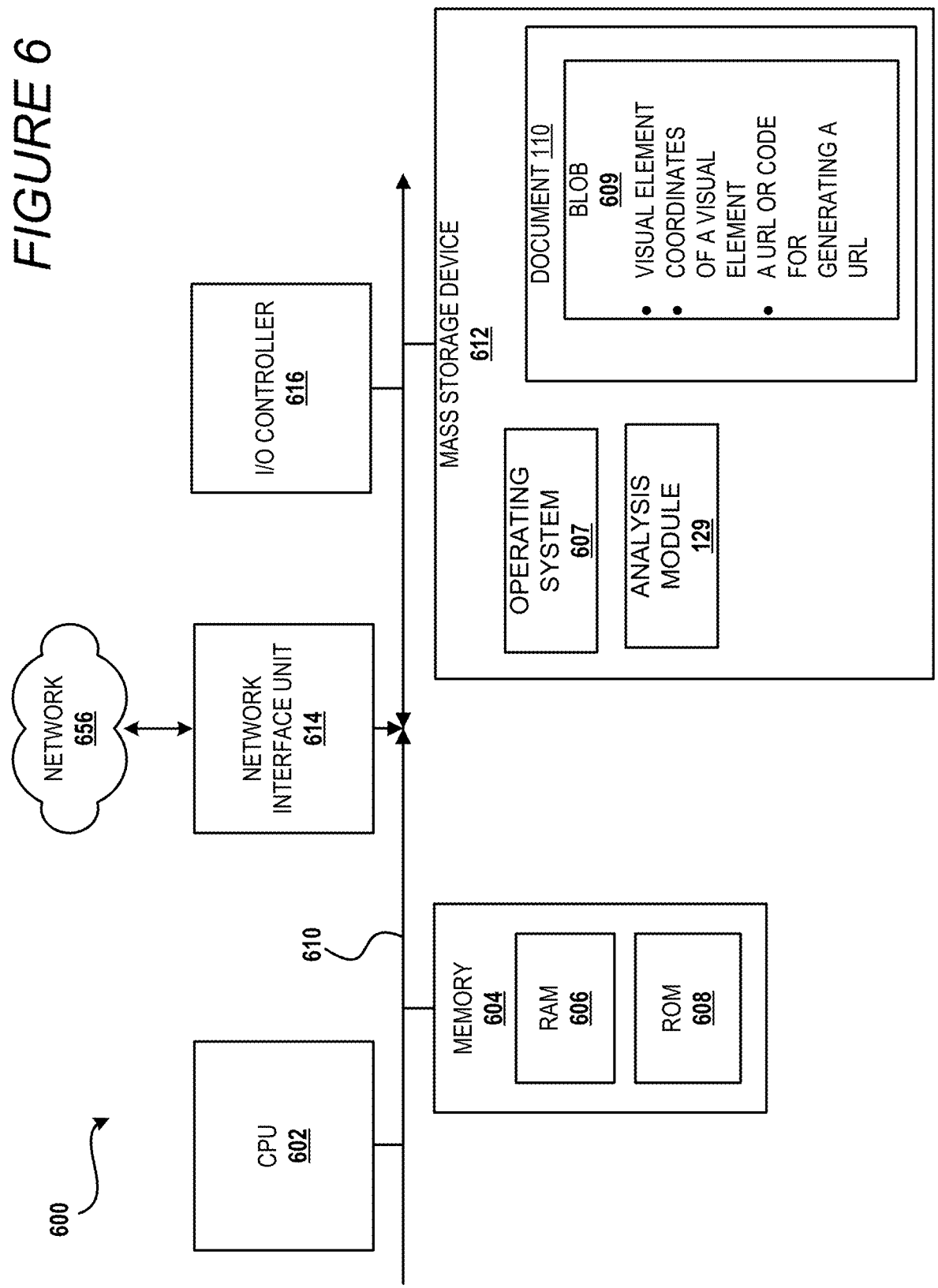
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as the document server 120 (FIG. 1), capable of executing the program components described herein. Thus, the computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more applications, such as the analysis module 129. The mass storage device 612 can also store other items such as the document 110. As shown, a document can comprise at least one blob 609 that comprises at least one visual element, coordinates of the visual element for identifying a selectable region within a document, an address such as URL, and/or executable code for generating a URL.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
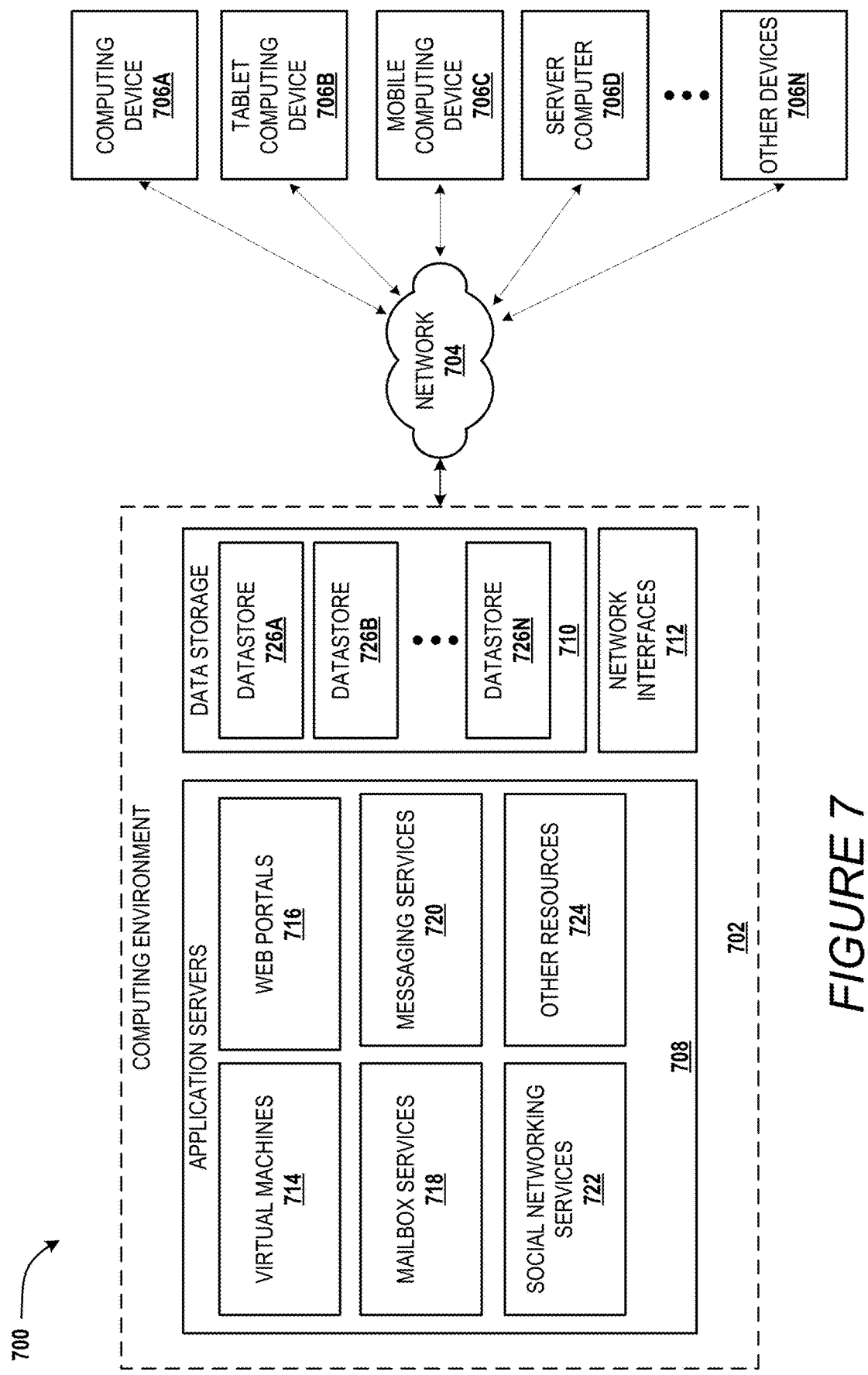
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 6. The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 5 and 7. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling efficient testing disclosed herein. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 7. Any device or service depicted herein can be used as a resource for supplemental data, including email servers, storage servers, etc.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 7.

Turning now to FIG. 8, an illustrative computing device architecture 800 for a computing device that is capable of executing various software components described herein for enabling the techniques disclosed herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIG. 1 and FIG. 7. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computer-implemented method, comprising:

receiving a request to determine a risk level an electronic document having a number of visual elements;

analyzing the visual elements to identify URLs embedded in the electronic document, wherein each of the URLs embedded in the electronic document are associated with at least one visual element and at least one associated selectable region of the electronic document;

causing an execution of a click simulation process for executable code embedded in the electronic document, wherein the click simulation process causes the executable code associated with one or more selectable regions of the electronic document to generate additional URLs, wherein each of the additional URLs are associated with one or more visual elements and one or more selectable regions, wherein page requests generated by the click simulation process are blocked from transmission to one or more remote computing devices;

generate a score for one or more URLs identified in the analysis of the visual elements and the additional URLs generated by the executable code, wherein the score for each URL is based on a size or a position of at least one associated visual element;

select a subset of URLs from the URLs identified in the analysis of the visual elements and the additional URLs generated by the executable code, wherein individual URLs having an associated score that meets one or more criteria are selected for the subset of URLs;

causing an execution of a testing process for the subset of URLs, wherein the testing process comprises generating subsequent page requests for target data from the one or more remote computing devices identified in the subset of URLs, the testing process generating risk level data from an analysis of one or more computer-implemented actions caused by the target data, the risk level data indicating a risk level for the individual URLs of the subset of URLs;

communicating the risk level data to a requesting device providing an indication of one or more security measures to be performed in association with the individual URLs of the subset of URLs; and blocking the embedded URLs from transmission to one or more remote computing devices prior to the analysis of the visual elements.

2. The computer-implemented method of claim 1, wherein a first score for a first URL of the one or more URLs is greater than a second score for a second URL of the one or more URLs when a first visual element associated with the first URL has a shorter distance to a center point of a rendering of the electronic document than a second visual element associated with the second URL.

3. The computer-implemented method of claim 1, wherein a first score for a first URL of the one or more URLs is greater than a second score for a second URL of the one or more URLs when a first visual element associated with the first URL is larger than a second visual element associated with the second URL.

4. The computer-implemented method of claim 1, wherein a first score for a first URL of the one or more URLs is greater than a second score for a second URL of the one or more URLs when a first visual element associated with the first URL is has a color or a graphical feature that is more prominent than a second visual element associated with the second URL.

5. The computer-implemented method of claim 1, wherein each score of the one or more URLs is further based on an associated level of suspiciousness of each URL, wherein a first score for a first URL of the one or more URLs is greater than a second score for a second URL of the one or more URLs when a level of suspiciousness associated with the first URL is greater than a level of suspiciousness associated with the second URL.

6. The computer-implemented method of claim 1, wherein the click simulation process is executed in a first sandbox computing environment configured to block all outgoing page requests, wherein the testing process for the subset of links is executed in a second sandbox computing environment, wherein the second sandbox computing environment is configured to isolate operations of the testing process from operations of the click simulation process.

7. The computer-implemented method of claim 1, further comprising: generating a ranked list of the individual URLs, wherein the ranked list is based on individual scores associated with the individual URLs, wherein the subset of URLs is based on a number of URLs that are tested within a predetermined time period, wherein the testing process processes the individual URLs in an order according to the individual scores, starting with URLs that are ranked highest in the ranked list.

8. The computer-implemented method of claim 1, wherein an individual score of an individual URL meets one or more criteria when the individual score exceeds a predetermined threshold.

9. The computer-implemented method of claim 8, wherein the predetermined threshold is adjusted based on at least one of historical data indicating an increase in threat levels, an increase or decrease in available computing resources available for the testing process.

10. A computer-implemented method, comprising:
analyzing visual elements of a document to identify URLs embedded in a document, where each of the URLs of the document are associated with at least one visual element and at least one associated selectable region of the document;

causing executable code embedded in the document to generate additional URLs, wherein each of the additional URLs are associated with one or more visual elements and one or more selectable regions, wherein page requests generated by the executable code embedded in the document are blocked from transmission to one or more remote computing devices;

selecting a subset of URLs from the URLs identified in the analysis of the visual elements and the additional URLs generated by the executable code, wherein individual URLs associated with a visual element having a position or size that meets one or more criteria are selected for the subset of URLs, wherein the selection of the subset of URLs is for execution of a testing process for the subset of URLs;

communicating subsequent page requests using each of the URLs of the subset of URLs, the subsequent page requests obtaining target data from the one or more remote computing devices identified in the subset of URLs; and generating risk level data from an analysis of one or more computer-implemented actions caused by target data received in response to the subsequent page requests, wherein the risk level data indicates a risk level for the individual URLs of the subset of URLs, wherein the risk level data provides an indication one or more security measures to be performed in conjunction with the individual URLs of the subset of URLs.

11. The computer-implemented method of claim 10, further comprising: generating a ranked list of the individual URLs of the subset of URLs, wherein the ranked list comprises a first URL that has a higher ranking than a second URL in response to determining that a first visual element associated with the first URL has a shorter distance to a center point of a rendering of the document than a second visual element associated with the second URL, wherein target data received in association with the first URL is analyzed prior to the analysis of target data received in association with the second URL.

12. The computer-implemented method of claim 10, further comprising: generating a ranked list of the individual URLs of the subset of URLs, wherein the ranked list comprises a first URL that has a higher ranking than a second URL in response to determining that a first visual element associated with the first URL is larger than a second visual element associated with the second URL, wherein target data received in association with the first URL is analyzed prior to the analysis of target data received in association with the second URL.

13. A system comprising:
one or more processing units; and
a computer-readable storage medium having encoded thereon computer-executable instructions to cause the one or more processing units to execute a method comprising analyzing visual elements of a document to identify URLs embedded in a document, where each of the URLs of the document are associated with at least one visual element and at least one associated selectable region of the document;

causing executable code embedded in the document to generate additional URLs, wherein each of the additional URLs are associated with one or more visual elements and one or more selectable regions, wherein page requests generated by the executable code embedded in the document are blocked from transmission to one or more remote computing devices;

selecting a subset of URLs from the URLs identified in the analysis of the visual elements and the additional URLs generated by the executable code, wherein individual URLs associated with a visual element that has a position or size that meets one or more criteria are selected for the subset of URLs, wherein the selection of the subset of URLs is for execution of a testing process for the subset of URLs;

communicating subsequent page requests using each of the URLs of the subset of URLs, the subsequent page requests obtaining target data from the one or more remote computing devices identified in the subset of URLs; and generating risk level data from an analysis of one or more computer-implemented actions caused by target data received in response to the subsequent page requests, wherein the risk level data indicates a risk level for the individual URLs of the subset of URLs, wherein the risk level data provides an indication of one or more security measures to be performed in conjunction with the individual URLs of the subset of URLs.

14. The system of claim 13, wherein the instructions further cause the one or more processing units to generate a ranked list of the individual URLs of the subset of URLs, wherein the ranked list comprises a first URL that has a higher ranking than a second URL in response to determining that a first visual element associated with the first URL has a shorter distance to a center point of a rendering of the document than a second visual element associated with the second URL, wherein target data received in association with the first URL is analyzed prior to the analysis of target data received in association with the second URL.

15. The system of claim 13, wherein the instructions further cause the one or more processing units to generate a ranked list of the individual URLs of the subset of URLs, wherein the ranked list comprises a first URL that has a higher ranking than a second URL in response to determining that a first visual element associated with the first URL is larger than a second visual element associated with the second URL, wherein target data received in association with the first URL is analyzed prior to the analysis of target data received in association with the second URL.

16. The system of claim 13, wherein the instructions further cause the one or more processing units to generate a ranked list of the individual URLs of the subset of URLs, wherein the ranked list comprises a first URL that has a higher ranking than a second URL in response to determining that a first visual element associated with the first URL has is has a color or a graphical feature that is more prominent than a second visual element associated with the second URL, wherein target data received in association with the first URL is analyzed prior to the analysis of target data received in association with the second URL.

17. The system of claim 13, wherein the instructions further cause the one or more processing units to generate a ranked list of the individual URLs of the subset of URLs, wherein the ranked list comprises a first URL that has a higher ranking than a second URL in response to determining that the first URL has a higher level of suspiciousness than the second URL, wherein target data received in association with the first URL is analyzed prior to the analysis of target data received in association with the second URL.

18. The system of claim 13, wherein the executable code embedded in the document is executed in in a first sandbox configured to block all outgoing page requests, wherein the risk level data is generated in a second sandbox, wherein the second sandbox is configured to isolate the analysis of one or more computer-implemented actions caused by target data from operations performed in the first sandbox.

* * * * *